(12) United States Patent
Zhou (10) Patent No.: US 9,999,847 B2
(45) Date of Patent: Jun. 19, 2018

(54) VIBRATING INCLINED PLATE BOX SETTLEMENT SEPARATOR

(71) Applicants: KUNMING UNIVERSITY OF SCIENCE AND TECHNOLOGY, Kunming (CN); Xinglong Zhou, Kunming (CN)

(72) Inventor: Xinglong Zhou, Kunming (CN)

(73) Assignee: KUNMING UNIVERSITY OF SCIENCE AND TECHNOLOGY, Kunming (CN)

( * ) Notice: Subject to any disclaimer, the term of this patent is extended or adjusted under 35 U.S.C. 154(b) by 300 days.

(21) Appl. No.: 14/771,217

(22) PCT Filed: Jun. 5, 2013

(86) PCT No.: PCT/CN2013/076807
§ 371 (c)(1),
(2) Date: Aug. 28, 2015

(87) PCT Pub. No.: WO2014/139223
PCT Pub. Date: Sep. 18, 2014

(65) Prior Publication Data
US 2016/0008746 A1 Jan. 14, 2016

(30) Foreign Application Priority Data

Mar. 11, 2013 (CN) .......................... 2013 1 0076262

(51) Int. Cl.
*B01D 21/28* (2006.01)
*B01D 21/24* (2006.01)
(Continued)

(52) U.S. Cl.
CPC ....... *B01D 21/283* (2013.01); *B01D 21/0003* (2013.01); *B01D 21/0039* (2013.01);
(Continued)

(58) Field of Classification Search
CPC .......... B03B 5/62; B01D 21/02; B01D 21/28; B01D 21/283; B01D 21/0045;
(Continued)

(56) References Cited

U.S. PATENT DOCUMENTS

| 3,794,167 | A | * | 2/1974 | Olgard | ................ | B01D 21/283 210/519 |
| 3,894,955 | A | * | 7/1975 | Forsell | ................... | B01D 21/02 210/322 |
| 4,194,976 | A | * | 3/1980 | Robinsky | ........... | B01D 21/0045 210/137 |
| 4,545,969 | A | * | 10/1985 | Diekotter | ............... | B01D 33/04 210/384 |
| 2002/0074265 | A1 | * | 6/2002 | Gomez | .............. | B01D 21/0045 209/44 |
| 2008/0314823 | A1 | * | 12/2008 | Kulick, III | ......... | B01D 21/0003 210/521 |

(Continued)

FOREIGN PATENT DOCUMENTS

| CN | 1254619 A | 5/2000 |
| CN | 101239338 A | 8/2008 |

(Continued)

*Primary Examiner* — David C Mellon
*Assistant Examiner* — Benjamin L Lebron
(74) *Attorney, Agent, or Firm* — Gokalp Bayramoglu (57) ABSTRACT

The invention involves a vibrating inclined plate box settlement separator, which is used for the liquid-solid separation, particularly applicable to high-efficiency settling concentration and separation of solid particles from liquid or water. The separator consists of an upper box and a lower tapered hopper. The upper box and the lower tapered hopper are connected securely to each other and sealed. The upper box is a rectangular or square steel-structured box with two supporting platforms on both of its sides, on which several spring assemblies are installed. The inclined plate box modules which can independently vibrate are installed on the spring assemblies. The feed box is placed on top of or inside the upper box. An overflow collect chute is welded on the side of the box frame opposite to the feed box.

10 Claims, 6 Drawing Sheets

(51) Int. Cl.
  *B01D 21/02*   (2006.01)
  *B01D 21/00*   (2006.01)
  *B01D 21/01*   (2006.01)

(52) U.S. Cl.
  CPC ..... *B01D 21/0045* (2013.01); *B01D 21/0069* (2013.01); *B01D 21/02* (2013.01); *B01D 21/245* (2013.01); *B01D 21/2405* (2013.01); *B01D 21/2444* (2013.01); *B01D 21/01* (2013.01); *B01D 2221/04* (2013.01)

(58) Field of Classification Search
  CPC ............ B01D 21/0069; B01D 21/2427; B01D 17/0211; B01D 21/01; B01D 21/0003; B01D 21/0039; B01D 21/2405; B01D 21/2444; B01D 21/245; B01D 2221/04
  See application file for complete search history.

(56) References Cited

U.S. PATENT DOCUMENTS

2011/0278212 A1* 11/2011 Tyner ................ B01D 21/2422
                                                         210/170.09

FOREIGN PATENT DOCUMENTS

| | | | | |
|---|---|---|---|---|
| CN | 101559297 A | | 10/2009 | |
| CN | 101732898 A | * | 6/2010 | ......... B01D 21/0003 |
| CN | 101816844 A | | 9/2010 | |
| CN | 201586408 U | | 9/2010 | |
| GB | 1531807 A | | 11/1978 | |
| WO | WO 2011091722 A1 | * | 8/2011 | ......... B01D 21/0003 |
| WO | WO 2011151646 A1 | * | 12/2011 | ......... B01D 21/0045 |

* cited by examiner

VIBRATING INCLINED PLATE BOX SETTLEMENT SEPARATOR

TECHNICAL FIELD

The invention involves a vibrating inclined plate box settlement separator, which is used for the liquid-solid separation, particularly applicable to high-efficiency stinting concentration and separation of solid panicles from liquid or water.

TECHNICAL BACKGROUND OF THE INVENTION

Solid-liquid separation does not only involve the separation of solid particles from liquid or water, but also the classification of solid particles and their separation from each another. Solid-liquid separation is extensively applied in different fields such as mineral processing, metallurgy, environmental protection, as well as chemical, coal, power industries etc. The solid liquid separation has two main technologies, namely, concentration and filtration. Concentration has four types of major equipments: round pool thickeners, inclined-plate thickeners, inclined-tube thickeners, and high-efficiency thickeners.

The round pool thickeners exhibit defects such as vast land space, small capacity, poor efficiency, etc., which are limited in commercial practice and being gradually replaced by other devices.

High-efficiency thickeners can increase the capacity and improve, thickening efficiency by adding the suitable amount of flocculants into ore pulps. However, with their relatively high operating cost, these thickeners also have application constraints.

By installing inclined plates or tubes in set din tanks, lamella thickeners and inclined-tube thickeners can enlarge settlement areas, reduce the required hind areas, and increase capacities. Lamella thickeners include conventional open feed inclined plate thickeners, integrated inclined lamella thickening and classifying equipment (Chinese Patent, Publication No.: CN 1122578), and high-frequency vibrating multi-channel integrated lamella thickening and classifying equipment (Chinese Patent, Publication No: CN 101239338). Lamella thickeners and inclined-tube thickeners have been applied in production widely by their small land area and large capacity. In particular, the vibrating high-frequency multi-channel integrated lamella thickening and classifying equipment is one of the most widely used sizing-thickening equipment because it had solved the technical problems of conventional lamella thickeners such as inclined plates caked with mud and blockage of the settlement channels.

We have found that the existing lamella thickeners also have several technical limitations in practice. These limitations include more parts required for the inclined plate assembly, unstable support of the inclined plate assembly, easily deformed of plate etc., which should be improved and enhanced.

DESCRIPTION

The purpose for the invention of vibrating inclined plate box settlement separator is to solve the technical limitations of the conventional lamella equipment, increase the stability and reliability, and maintain long-term efficiency and stable operations of the equipment.

The vibrating inclined plate box settlement separator is built by applying the following technical characteristics. The separator consists of two parts, namely, the upper box (1) and the lower tapered hopper (2), which are connected securely to each other and sealed.

The upper box (1) is a rectangular or square steel-structured box with a supporting platform (1-1) on its left and right sides. The supporting platforms (1-1) have several spring assemblies (3), on which mounted several inclined plate box modules (4) that can vibrate separately. A feed box (5) is found on top of or inside the upper box (1). An overflow collect chute (6) is welded on the side of the box frame opposite to the feed box (5). The inclined plate box modules (4) and overflow collect chute (6) are connected with the rubber tube (7).

The lower tapered hopper (2) is either square, rectangular square, or square round, it is placed securely on the steel-structured bracket of the equipment or to the reinforced concrete framework (8). A smaller wear-resistant tapered hopper (9) is connected to the bottom of the first hopper (2).

In the inner wall of the small wear-resistant tapered hopper (9) can install a materials removal device (10). Meanwhile, an underflow forced discharge device (11) with a flow rate control valve (12) underneath can be connected to the bottom of the small wear-resistant tapered hopper (9).

The lower tapered hopper (2) is made of welded steel structures or reinforced concrete. The inside of the smaller hopper (9) is lined with wear-resistant rubber or coated with polyurethane. The hoppers (2 and 9) are connected by screws and bolts and sealed with wick or rubber mats.

The inclined plate box modules (4) have several inclined plate boxes (4-2) which are inserted into the parallelogram frames (4-1) at angles of 30° to 70° between the sloped side (4-1-1) of the parallelogram frame and ground level.

The inclined plate box (4-2) is rectangular, with a length equal to that of the sloped side (4-1-1) of the parallelogram frame (4-1). The top (4-2-1) and bottom (4-2-2) panels of the inclined plate box (4-2) consists of the titled settlement plate. More than two inner ribs (4-2-3) support the top (4-2-1) and bottom (4-2-2) panels of the inclined plate box along the width direction of the box (4-2). Consequently, each inclined plate box (4-2) forms several long and narrow independent settlement channels (4-2-5). A guide edge on the side wall (4-2-4) of each inclined plate box (4-2) prevents any displacement when assembling multiple inclined plate boxes.

The inclined plate boxes (4-2) are made of polycarbonate, polystyrene, polymethylmethacrylate, polythene, polypropylene, polyvinyl chloride, polyester fiber, acrylic butadiene styrene, and other parent materials, along with wear-resistant, antistatic, and hydrophobic additives. The boxes are extruded from the mold with prepared pellets.

The inclined plate boxes (4-2) are inserted one by one into the sloped side (4-1-1) of the parallelogram frame, and the lower parts of the boxes are supported b square steel, angle steel, or other profiles at the bottom of the frame. The bottom panel (4-2-2) of the second inclined plate box is firmly attached to the top panel (4-2-1) of the in inclined plate box. The two surfaces support each other. Furthermore, the inclined settlement plate is twice as thick as a single inclined plate box.

After more than 10 inclined plate boxes (4-2) are inserted into the parallelogram frame (4-1), a middle frame (4-3) made of shaped steel is loaded and compact the inclined plate boxes. Both sides of the middle frame are welded onto the two sides of the framework (4-1) to prevent any displacement of the inclined plate boxes (4-2) as well as to increase the strength and rigidity of the frame. The inclined plate boxes are then loaded by the same method described above. When the required settlement area is reached, the inclined plate boxes are compacted with another middle frame (4-3). The two sides of the middle frame (4-3) are welded onto the parallelogram frame (4-1) to form a settlement module.

The overflow chute side frame (4-4) is installed on the top part of the settlement module and with the same width as the parallelogram frame (4-1). The inside of the overflow chute side frame (4-4) has an inner overflow chute (4-5) which have adjustable height and tilt angle. In addition, an overflow discharge tube (4-6) is welded on one end of the overflow chute side frame (4-4).

The vibrator bracket (4-7) is welded at the center-of-gravity position of the settlement module and on the two sides of the frame. The bottom plate of the vibrator (4-8) is welded on the top of the vibrator bracket (4-7), and the vibrator (4-9) is fastened onto the bottom plate (4-8) with screws and bolts. The vibrator (4-9) may be mechanical, electromagnetic, or any other kind. The vibration frequency of vibrator is 800-3000 times/min and the power is 0.15-1.0 kW, which are determined by the vibration amplitude and settlement area of the modules. Thus, the entire vibrating inclined plate box module (4) is obtained.

The parallelogram flame (12) is welded with angle steel, U-steel, square steel, etc. The length (L) of the parallelogram frame (4-1) is 500-5000 mm or more, the height (H) is 500-2000 mm or more and the width (B) 300-1000 mm or more. The spring assemblies (3) may be compound springs made of rubber, steel, polyurethane, or any flexible material.

The vibrating inclined plate box modules (4) can be installed inside a box-type thickener or as central driving round pool-type thickener. As to box-type thickener, the vibrating inclined plate box modules (4) are arranged in parallel on the same horizontal plane. The settlement separator that consists of more than four vibrating inclined plate box modules (4) can be furnished with more than two lower tapered hoppers. As to round pool-type thickener, the vibrating inclined plate box modules (4) can be arranged in linear or radial form, with the necessary distance set aside for installing the overflow chute side frame (4-4) and the inner overflow chute (4-5) between two neighboring vibrating inclined plate box modules (4).

While in operation, the inclined plate box modules (4) adopt an intermittent vibration design. Vibration time and intermittence time can be adjusted via an external control cabinet. When the inclined plate box modules (4) are few, they can vibrate separately at different times, by contrast, when the inclined plate box modules (4) are numerous, they can vibrate in group at different times.

When the concentration of underflow is less than 50%, the materials removal device (10) on the inner wall of the small tapered hopper and the underflow forced discharge device (11) are unnecessary. The flow rate control valve (12) is directly installed into the bottom of the small wear-resistant tapered hopper (9).

Advantages of the Invention

The vibrating inclined plate box settlement separator can exhibit the following positive effects:

1. The conventional inclined plate is replaced with a entirety inclined plate box, which eliminates the arduous processes of conventional inclined plate assembly involved such as fastening side plates, divide bars fixtures as well as bolting or screwing side plates to the steel frame of the inclined plate. That is the proposed inclined plate box has a more efficient and convenient installation process.

2. The inner ribs of each inclined plate box securely connect and support the top and bottom panels of the inclined plates, which can prevents the inclined plate boxes do not happen the situation such as deformation, displacement, or loss of the inclined plates during installation and operation, but often occurred for the conventional inclined plates.

3. The inner ribs of the inclined plate boxes divide the settlement channel, which forms several narrow settlement channels along the width direction of the inclined plate boxes. Consequently, the settle hydraulic model of the solid particles is refined and separation efficiency is increased remarkable.

4. The top panel of an inclined plate box and the bottom panel of another inclined plate box make closely overlap, which doubles the thickness and increases the surface strength of the titled settlement plate. The plate box is not only do not deformed but its wear-out period and lifetime, is more than doubled also.

5. Bolts and screws are not necessary when fixing the inclined plate boxes. As inclined plate boxes are securely linked, the vibration frequency and intensity can be increased, and vibration effects are significantly better than that of existing lamella thickeners. These features can guarantee that fine materials sliding smoothly along the surface of the settlement plates.

6. The materials removal device is integrated onto the inner wall of the small tapered hopper, as well as the underflow forced discharge device is connected to bottom of the tapered hopper, which enables the tapered hopper without stacked materials and equipment to discharge paste high-concentration underflow smoothly. The application field of the equipment can be expanded.

7. The vibrating inclined plate box modules (4) of the invention can be applied to the box-type thickener with a tapered hopper as well as to the round pool-type thickener with a driving frame, which solves the problem of large scale and height of equipment.

SPECIFICATION OF ATTACHED FIGURES

Along with the embodiment shown, the structure of the proposed equipment is further explained. The protection scope of the invention, however, is not limited to the embodiment.

REFERENCE NUMERALS

Each number or string of numbers corresponds to a part of the equipment.

1: upper box, 2: lower tapered hopper, 3: spring assemblies, 4: inclined plate box modules, 5: feed box, 6: overflow collect chute, 7: rubber connecting pipe, 8: supporting frame of the entire equipment, 9: small wear-resistant tapered hopper, 10: materials removal device on the inner wall of the tapered hopper, 11: underflow forced discharge device, 12: flow rate control valve

4-1: parallelogram frame 4-1-1: sloped side of the parallelogram frame, 4-2: inclined plate box, 4-3: middle frame where the inclined plate boxes are fastened, 4-4: side frame of overflow chute, 4-5: inner overflow chute, 4-6: overflow discharge tube, 4-7: vibrator bracket, 4-8 bottom plate of the vibrator, 4-9 vibrator

4-2-1: top panel of the inclined plate box, 4-2-2: bottom panel of the inclined plate box, 4-2-3: inner ribs of the inclined plate box, 4-2-4: side wall of the inclined plate box, 4-2-5 settlement channels of the inclined plate box.

IMPLEMENTATION DETAILS

Figure 1:
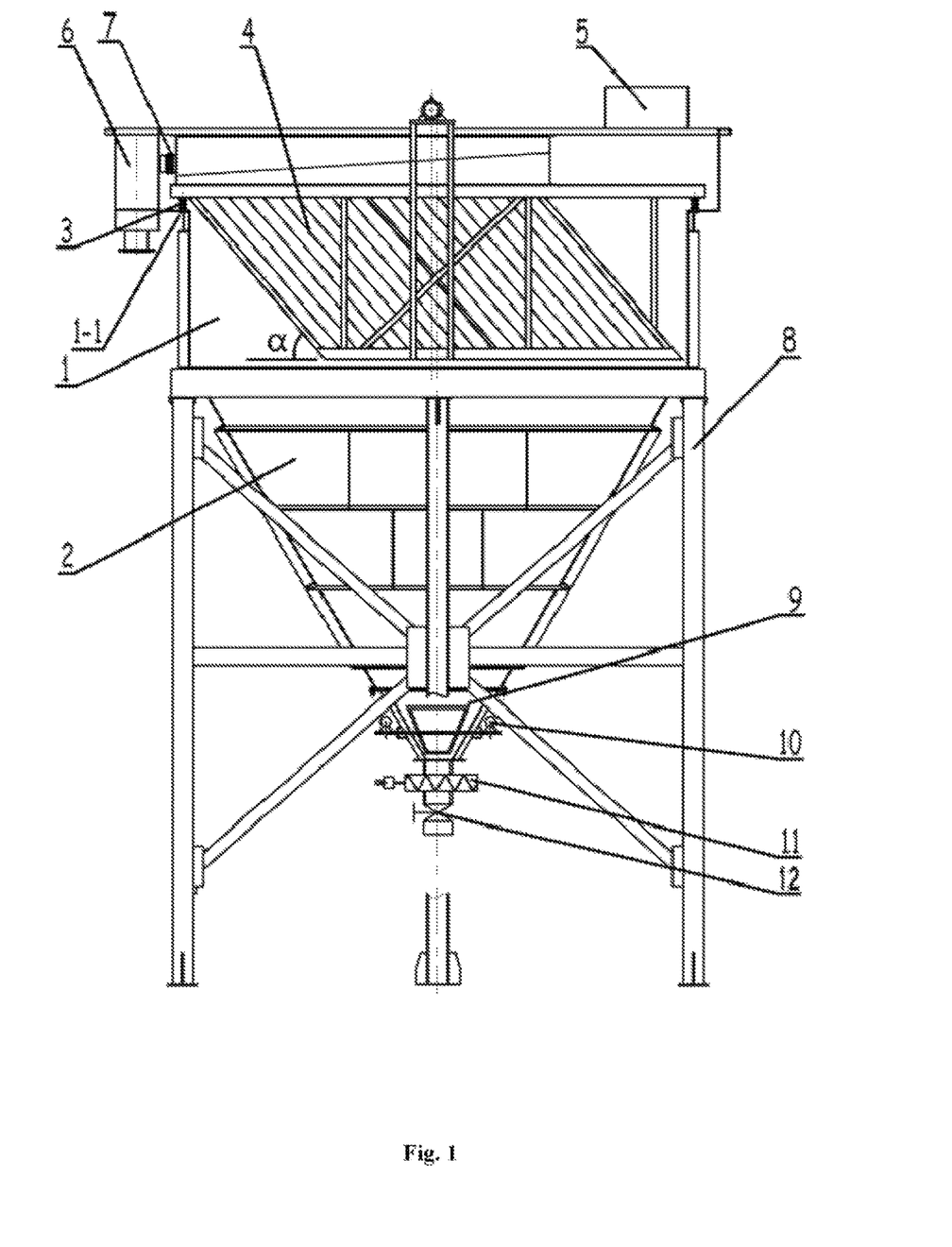
FIG. 1: Diagrammatic sketch of the settlement separator.
Figure 2:
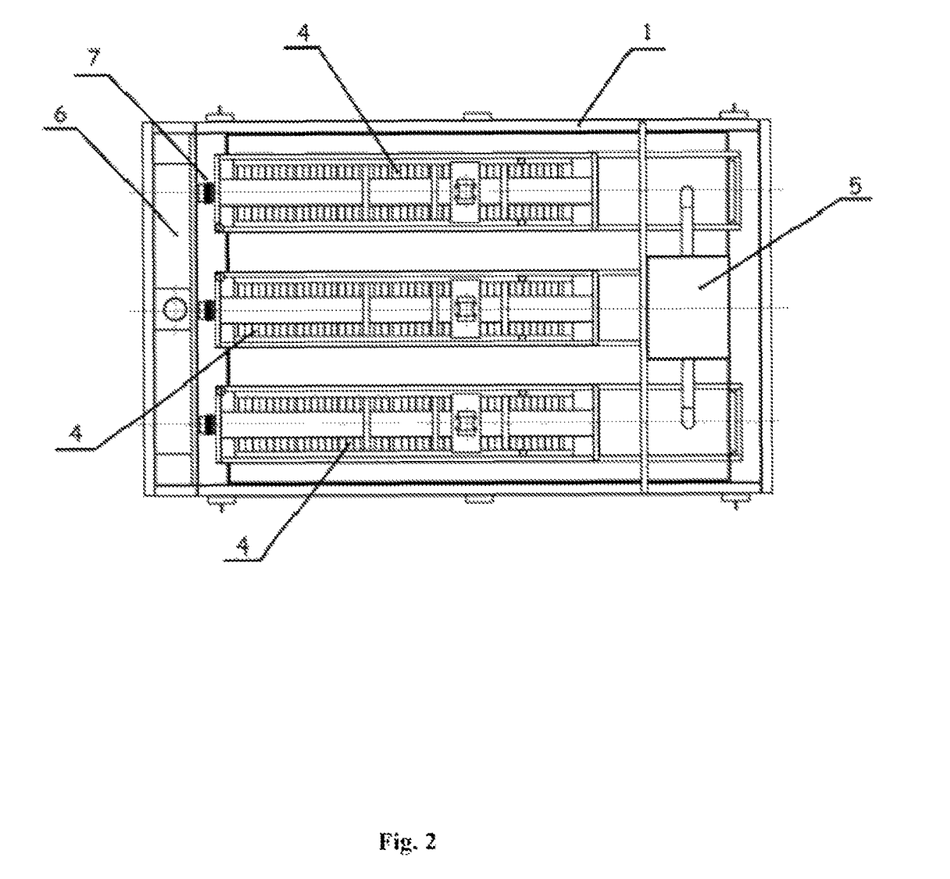
FIG. 2: Top view of the settlement separator.

The main structure of the invention consists of the upper box (1) and the lower tapered hopper (2). The upper box (1) is a rectangular or square welded steel structure. Both the left and right sides of the upper box have supporting platforms (1-1), on which several spring assemblies (3) are furnished. The spring assemblies (3) are made of rubber, steel, polyurethane, or other flexible materials. The inclined plate box modules (4), which can vibrate separately, are mounted on the spring assemblies. A feed box (5) is found on the top side of or inside the upper box (1). An overflow collect chute (6) is welded on the side opposite to the feed box (5). The overflow collect chute (6) is connected to inclined plate box modules (4) with flexible rubber pipes (7). The lower tapered hopper (2) is a square or rectangular square or a square round hopper, which is made of welded steel structural parts or reinforced concrete and is completely supported on a steel-structured bracket or reinforced concrete framework (8). The upper box and the lower tapered hopper are welded to each other and sealed. A smaller wear-resistant tapered hopper (9) is connected to the bottom of the lower tapered hopper (2). The inner wall of the smaller bracket is lined or coated with rubber polyurethane, or other wear-resistant materials. When the underflow discharge concentration of the separator is more than 50%, the small tapered hopper is furnished with a material removal device (10) on its inner wall (Chinese Patent, Publication No.: CN 101816844). The two hoppers (2 and 9) are connected by flange with bolts and screws, and the middle between flanges is sealed with wick or rubber mats. The underflow forced discharge device (11) (Chinese Patent, Publication No.: CN 101559297) is connected to the bottom of the small tapered hopper by flange with bolts or screws, and the flow rate control valve (12) is connected to the bottom of the underflow forced discharge device (11). When the underflow discharge concentration of the separator is less than 50%, installing a materials removal device on the inner wall of the tapered hopper (10) and the underflow forced discharge device (11) are not necessary. The flow rate control valve (12) is then directly installed on to the bottom of the small wear-resistant tapered hopper (9).

In FIGS. 3, 4, 5 and 6, 4-1 designates the parallelogram frame on which the inclined plate boxes are installed and supported, 4-2 designates the inclined plate boxes, 4-3 designates the middle frame fastened to the inclined plate boxes, 4-4 designates the side frame of the overflow chute of the modules, 4-5 designates the inner overflow chute, 4-6 designates the overflow discharge tube, 4-7 designates the vibrator bracket, 4-8 designates the bottom plate of the vibrator, and 4-9 designates the vibrator. The parallelogram frame (4-1) is welded by angle steel, U-steel, square steel, or spliced by other light alloys or plastic steel. The angle ($\alpha$) between the sloped side (4-1-1) of the parallelogram frame and ground level ranges from 30° to 70°. The length (L) of the parallelogram frame is 500-5000 mm of more, the height (H) is 500-2000 mm or above, and the width (B) is 300-1000 mm or more. The inclined plate box (4-2) is long rectangular box, which are made of polycarbonate, polystyrene, polymethylmethacrylate, polythene, polypropylene, polyvinyl chloride, polyester fiber, acrylic butadiene styrene, and other parent materials, along with wear-resistant, antistatic, and hydrophobic additives. The boxes are extruded from the molds by using prepared pellets. The length of each inclined plate box is the same as that of the sloped side of the parallelogram frame ranges from 500-3000 mm. The width of the box is the same as the inside width of the parallelogram frame, which is within 300-1000 mm and thickness of the box is between 20-100 mm. Both the top panel (4-2-1) and bottom (4-2-2) panel of each inclined plate box constitute the titled settlement plate. More than two inner ribs (4-2-3) connect and support the top and bottom panels of the plate boxes along the width direction and each inclined plate box (4-2) divided into several separate long and narrow settlement channels (4-2-5). The side wall (4-2-4) of the box has a guide edge for positioning during installation. The thickness of the plate box surface, i.e., those of the inner rib the side wall and panels, ranges from 0.5 mm to 5 mm. The inclined plate boxes (4-2) are inserted into the sloped side (4-1-1) of the parallelogram frame from top to bottom one by one, and the lower parts of the boxes are supported by square steel, angle steel, or other profiles at the bottom of the frame. The bottom panel (4-2-2) of the second inclined plate box is firmly attached to the top panel (4-2-1) of the first inclined plate box with the two surfaces supporting each other. Thus, the thick of the inclined settlement plate is twice as that if a single inclined plate box.

Figure 3:
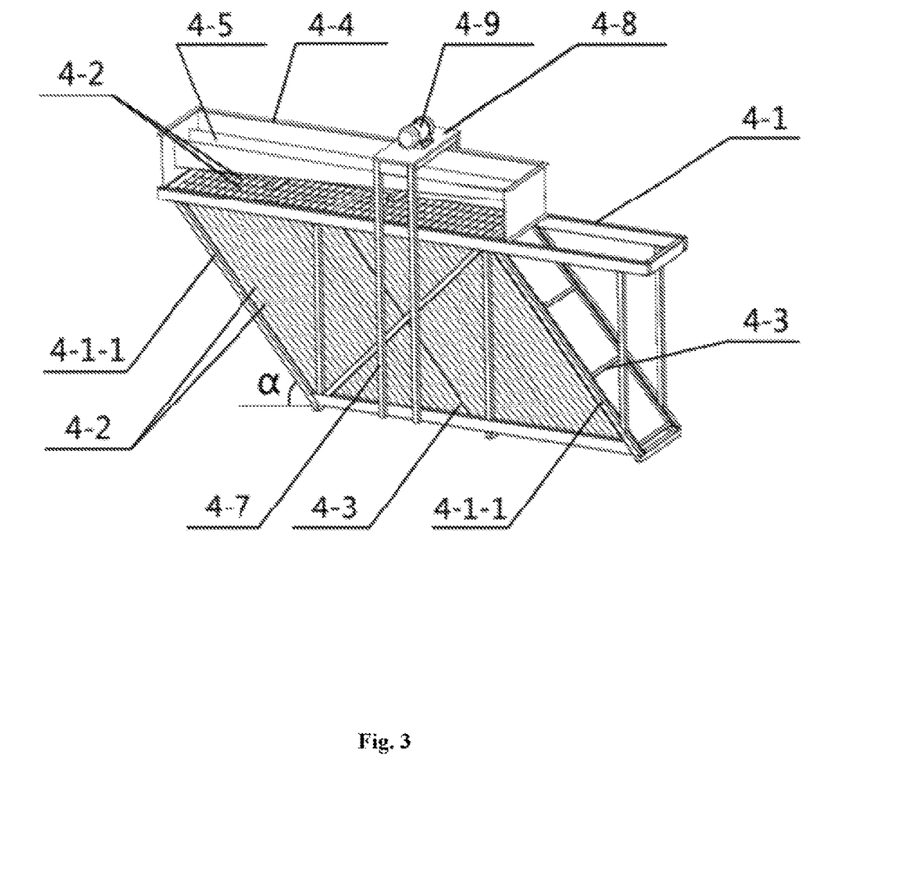
FIG. 3: Three-dimensional view of the inclined plate box modules (4).
Figure 4:
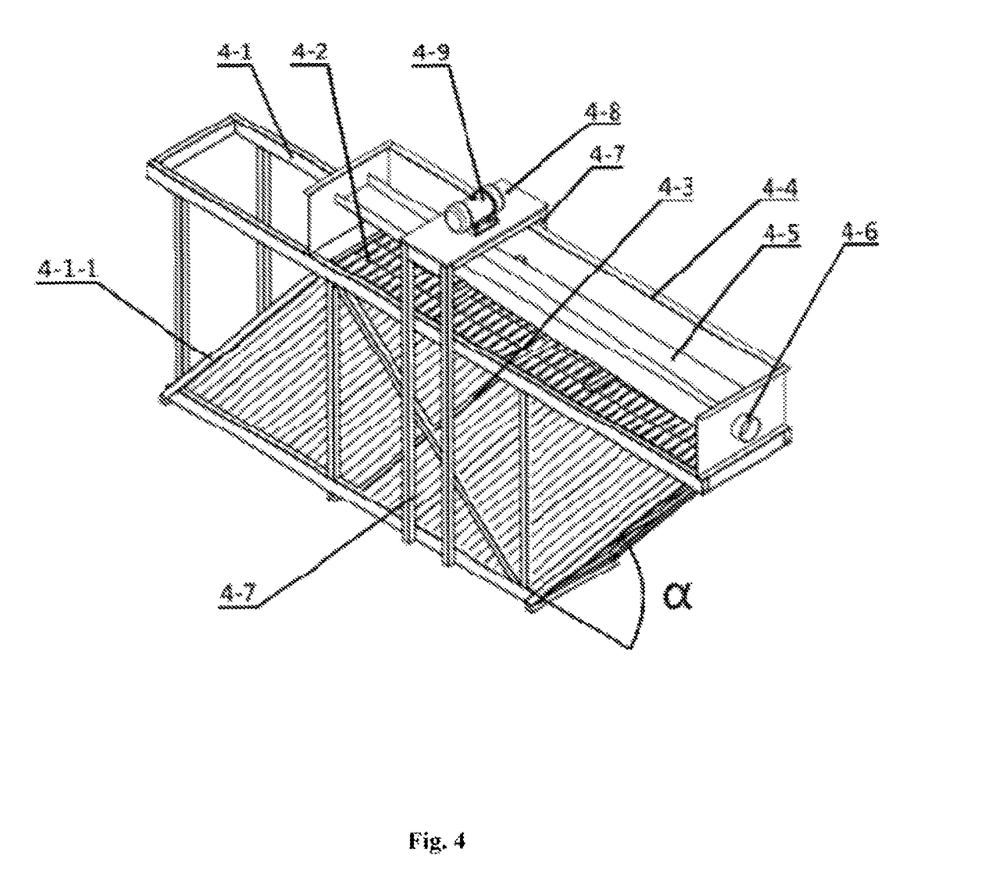
FIG. 4: Three-dimensional view the inclined plate box modules (4) opposite to FIG. 3.

After more than 10 inclined plate boxes (4-2) are inserted into the parallelogram frame (4-1), the middle frame made of steel (4-3) is loaded and compact tightly on the packed inclined plate boxes. The two sides of the middle frame (4-3) are welded to the two sides of the parallelogram frame (4-1) to prevent any displacement of the inclined plate box as well as to increase the strength and rigidity of the parallelogram frame (4-1). Then, additional inclined plate boxes are mounted following the aforementioned method. When the desired settlement area is achieved, the already packed inclined plate boxes are compacted tightly with another middle frame (4-3). The two sides of the middle frame (4-3) are welded to the parallelogram frame (4-1) to form as settlement module.

The overflow chute side frame is d on the top part of the settlement module and with the same width as the parallelogram frame (4-1). The inside of the overflow chute side frame (4-4) has an inner overflow chute (4-5) which have adjustable height and tilt angle. In addition, an overflow discharge tube (4-6) is welded on one end of the overflow chute side frame (4-4). The vibrator bracket (4-7) is welded at the center-of-gravity position of the settlement module and on the two sides of the frame. The bottom plate of the vibrator (4-8) is welded on the top of the vibrator bracket (4-7), and the vibrator (4-9) is fastened onto the bottom plate (4-8) with screws and bolts. The vibrator (4-9) may be mechanical, electromagnetic, or any other kind. The vibration frequency of vibrator is 800-3000 times/min and the power is 0.15-1.0 kW, which are determined by the vibration amplitude and settlement area of the modules. Thus, the entire vibrating inclined plate box module (4) is obtained.

The vibrating inclined plate box modules (4) of the invention can be installed inside a box-type thickener or a central driving round pool-type thickener. As to box-type thickener, the vibrating inclined plate box modules (4) are arranged in parallel on the same horizontal plane. The settlement separator that consists of more than four vibrating inclined plate box modules (4) can be furnished with more than two lower tapered hoppers. As to round pool-type thickener, the vibrating inclined plate box modules (4) can be arranged in linear or radial form, with the necessary distance set aside for installing the overflow chute side frame (4-4) and the inner overflow chute (4-5) between two neighboring vibrating inclined plate box modules (4).

While in operation, the inclined plate box modules adopt an intermittent vibration design. Vibration time and intermittence time can be adjusted via an external control cabinet. When the inclined plate box modules (4) are few, they can vibrate separately at different times; by contrast, when the inclined plate box modules (4) are numerous, they can vibrate in group at different times.

Embodiment 1

An ilmenite concentrator, in which ore pulps needs to thick and deslimed before flotation. The size of desliming is limited to 19 μm. The feeding concentration of the ore pulp is 12%, the flow rate is 980 m³/h, and the content of −200 meshes is 75%. The underflow concentration after enrichment should be 30%-35%, and the −19 μm content of overflow should be ≥92%. The design adopts as vibrating inclined plate box settlement separator with a total settlement area of 800 m².

The separator is a box-type structure with a welded steel upper box (1) and lower tapered hopper (2). Two parallel rows of 16 vibrating inclined plate box modules (4) are found inside the upper box. The settlement area of each inclined plate box module is 50 m². On the left and right supporting platforms (1-1) of the upper box (1), two groups of rubber spring assemblies (3) are furnished. A feeding box (5) installed on the top of the upper box (1). On the left and right sides of the upper box (1), an overflow collect chute (6) is welded. The inclined plate box modules (4) are connected to the overflow collect chute (6) via the rubber connecting pipes (7). The lower tapered hopper is composed of four hoppers. The small wear-resistant tapered hopper (9) is connected to the bottom of each hopper. The inner wall of the small hopper (9) is coated with polyurethane for wear-resistant. The bottom of the small wear-resistant tapered hopper (9) is connected to a flow rate control valve (12). The entire equipment is supported by a steel-structured bracket (8).

Four vibrating inclined plate box (4) are installed horizontally inside the upper box (1), which correspond to each lower tapered hopper. The parallelogram frame (4-1) of the module is spliced and welded by steel structures. The included angle (α) between the frame and ground level is 50°. The length of the parallelogram frame is 5800 mm, the height is 1500 mm, and the width is 700 mm. The width of the inclined plate box (4-2) is 620 mm, the length is 1800 ram, and the thickness is 50 mm. There are four inner ribs (4-2-3) along with the width direction of the inclined plate box, which divide the inclined plate box into five long and narrow settlement channels (4-2-5) of the same size. The thickness of panels (4-2-1) and (4-2-2), the inner ribs (4-2-3), and the side wall (4-2-4) of the plate box are 3.0 mm. After the two sides of the inclined plate box tilt to 50°, which are inserted to the parallelogram frame (4-1) one by one. The bottom of the boxes is supported by square steel. After 24 inclined plate boxes are inserted, the middle frame (4-3) made of square steel is mounted and compact tightly to the inserted boxes. The two sides of the middle frame (4-3) are welded to the side frame of the parallelogram frame (4-1). While two more groups of inclined plate boxes with 24 boxes are inserted following the same method above, another middle frame (4-3) is mounted and compact tightly to the inserted boxes, the two sides of the middle frame are welded to the side frame of the parallelogram frame, a settlement module (4) is formed.

The side frame of the overflow chute (4-4) is installed on the upper part of the settlement module with the same width as the parallelogram frame (4-1). The inside of the side frame of the overflow chute (4-4) has an inner overflow chute (4-5), its height and tilt angle are adjustable. The overflow discharge tube (4-6) is welded to one end of the overflow chute (4-4). The vibrator bracket (4-7) is welded on the two sides at the center-of-gravity position of frame of the settlement module. The bottom plate of the vibrator (4-8) is welded on top of the bracket, and a mechanical vibrator (4-9) with the rated power of 0.55 kW is installed on the bottom plate with screws and bolts. The frequency of the vibrator 2980 times/min.

Sixteen inclined plate box modules divide into four groups and intermittently vibrate by group, with vibration time lasting for 1 min and intermittence time lasting for 180 min. Both vibration time and intermittence time can be regulated via an external control cabinet as required.

The average concentration of under of the settlement separator reached to 33%, and −19 μm content of overflow ≥95% when the equipment put into use. The distortion of inclined plate boxes, as well as caking or blockage of settlement channel do not observed during the operation. The expected benefits are achieved.

Embodiment 2

A small iron ore concentrator, in which the concentrate needs to dewater and its water recovery to the concentrator for reuse. The ore pulp concentration of the concentrate is 15% with the flow rate is 120 m³/h. The underflow concentration after enrichment should be 65%, and the solid content of overflow should be as well as the water recovery should be ≥70%.

The design adopts a vibrating inclined plate box settlement separator with a total settlement area of 400 m². The separator is a box-type structure with a welded steel upper box (1) and lower reinforced concrete tapered hopper. Two parallel rows of 10 vibrating inclined plate box modules (4) are found inside the upper box. The settlement area of each inclined plate box module is 40 m². On the left and right supporting platforms (1-1) of the upper box (1), two groups of rubber spring assemblies (3) are furnished. A feeding box (5) and overflow collect chute (6) is installed on the top and is welded to the left and right sides of the upper box (1). The inclined plate box modules (4) are connected to the overflow collect chute (6) via the rubber connecting pipes (7). A small wear-resistant tapered hopper inside wall lined with high density polyethylene (9) is connected to the bottom of the lower tapered hopper (2). A materials removal device (10) is installed to the inner wall of the small wear-resistant tapered hopper (9). Meanwhile, an underflow forced discharge device (11) with a flow rate control valve (12) underneath is connected to the bottom of the small wear-resistant tapered hopper (9). The entire equipment is supported by upright reinforced concrete columns (8).

Figure 5:
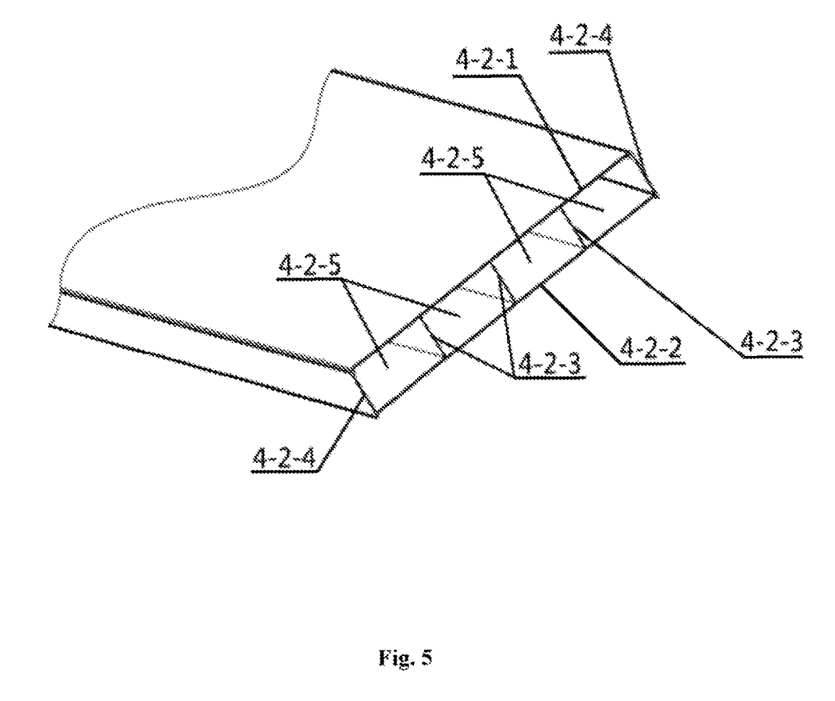
FIG. 5: Diagrammatic sketch of a single inclined plate box (4-2).
Figure 6:
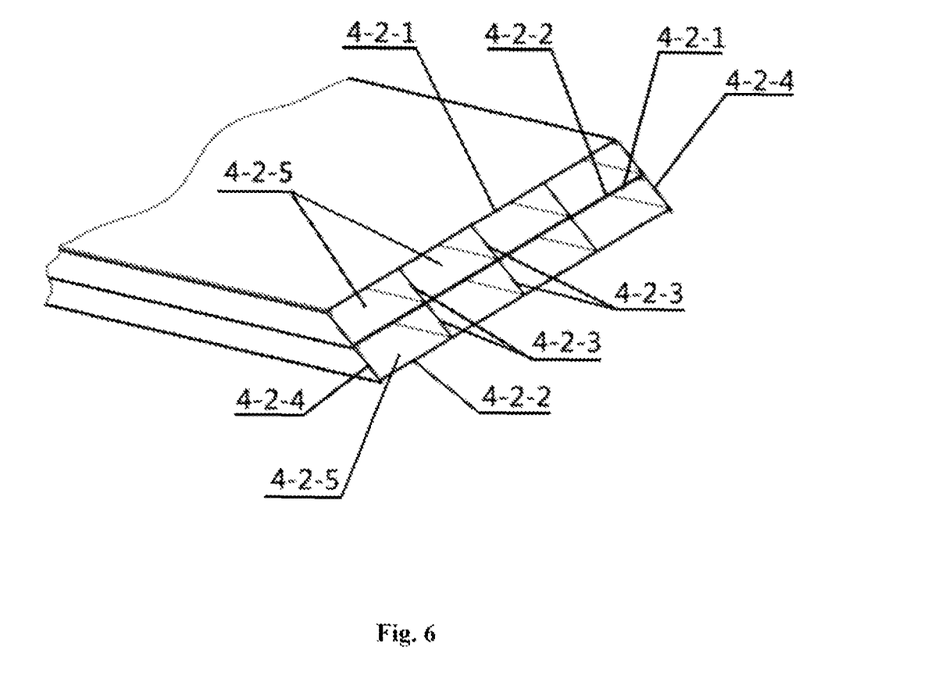
FIG. 6: Diagrammatic sketch of two inclined plate boxes (4-2) superimposed on each other.

The parallelogram frame (4-1) of the inclined plate box module is spliced and welded by steel structures. The included angle (α) between the frame and ground level is 45°. The length of the parallelogram frame is 3800 mm, the height is 1600 mm, and the width is 750 mm. The width of the inclined plate box (4-2) is 650 mm, the length is 2500 mm, and the thickness is 45 mm. There are five inner ribs (4-2-3) along with the width direction of the inclined plate box, which divide the inclined plate box into six long and narrow settlement channels (4-2-5) of the same size. The thickness of panels (4-2-1) and (4-2-2), the inner ribs (4-2-3), and the side wall (4-2-4) of the plate box are 2.0 mm. After the two sides of the inclined plate box tilt to 45°, which are inserted to the parallelogram frame (4-1) one by one. The bottom of the boxes is supported by angle steel. After 18 inclined plate boxes are inserted, the middle frame (4-3) made of square steel is mounted and compact tightly to the inserted boxes. The two sides of the middle flame (4-3) are welded to the side frame of the parallelogram frame (4-1). One more group of inclined plate boxes with 18 boxes are inserted following the same method above, another middle frame (4-3) is mounted and compact tightly to the inserted boxes, the two sides of the middle frame are welded to the side frame of the parallelogram frame, a settlement module (4) is formed.

The side frame of the overflow chute (4-4) is installed on the upper part of the settlement module with the same width as the parallelogram frame (4-1). The inside of the side frame of the overflow chute (4-4) has an inner overflow chute (4-5), its height and tilt angle are adjustable. The overflow discharge tube (4-6) is welded to one end of the overflow chute (4-4). The vibrator bracket (4-7) is welded on the two sides at the center-of-gravity position of frame of the settlement module. The bottom plate of the vibrator (4-8) is welded on top of the bracket, and a electricity-magnetic vibrator (4-9) with the rated power of 0.25 kW is installed on the bottom plate with screws and bolts. The frequency of the vibrator is 2680 times/min.

Ten inclined plate box modules divide into five groups and intermittently vibrate by group, with vibration time lasting for 2 min and intermittence time lasting for 240 min. Both vibration dine and intermittence time can be regulated via an external control cabinet as required.

The underflow concentration of the settlement separator reached to ≥67%, and solid content of overflow ≤260 mg/l while the water recovery reached to ≥75% when the equipment put into use. The distortion of inclined plate boxes, as well as caking or blockage of settlement channel do not observed during the operation. The expected benefits are achieved.

Embodiment 3

A golden concentrator with the unite process of gravity-separation and floatation, in which the final tailings needs to thicken and filtration, for drying discharge. The concentration of the tailings pulp is 15%, the flow rate is 650 m³/h, and the content of −200 meshes is 75%. The underflow concentration after enrichment should be ≥60% to meet the following filtration demand.

The design adopts a vibrating inclined plate box settlement separator with a total settlement area of 2000 m². The separator is a box-type structure with a welded steel upper box (1) and lower tapered hopper (2). Two parallel rows of 40 vibrating inclined plate box modules (4) are found inside the upper box. The settlement area of each inclined plate module is 50 m². On the left and right supporting platforms (1-1) of the upper box (1), two groups of rubber spring assemblies (3) are furnished. A feeding box (5) and overflow collect chute (6) is installed on the top and is welded to the left and right sides of the upper box (1). The inclined plate box modules (4) are connected to the overflow collect chute (6) via the rubber connecting pipes (7). The lower tapered hopper is composed of eight hoppers. The small wear-resistant inside wall coated with polyurethane tapered hopper (9) is connected to the bottom of each hopper. A materials removal device (10) is installed to the in wall of the small wear-resistant tapered hopper (9). Meanwhile, an underflow forced discharge device (11) with a flow rate control valve (12) underneath is connected to the bottom of the small wear-resistant tapered hopper (9). The entire equipment is supported by a steel-structured bracket (8).

Five vibrating inclined plate box modules (4) are installed horizontally inside the upper box (1), which correspond to each lower tapered hopper. The parallelogram frame (4-1) of the module is spliced and welded by steel structures. The included angle (α) between the frame and ground level is 55°. The length of the parallelogram frame is 6000 mm, the height is 1600 mm, and the width is 700 mm. The width of the inclined plate box (4-2) is 600 mm, the length is 2000 mm, and the thickness is 55 mm. There are four inner ribs (4-2-3) along with the width direction of the inclined plate box, which divide the inclined plate box into five long and narrow settlement channels (4-2-5) of the same size. The thickness of panels (4-2-1) and (4-2-2), the inner ribs (4-2-3), and the side wall (4-2-4) of the plate box are 2.5 mm. After the two sides of the inclined plate box tilt to 55°, which are inserted to the parallelogram frame (4-1) one by one. The bottom of the boxes is supported by square steel. After 25 inclined plate boxes are inserted, the middle frame (4-3) made of square steel is mounted and compact tightly to the inserted boxes. The two sides of the middle frame (4-3) are welded to the side frame of the parallelogram frame (4-1). While two more groups of inclined plate boxes with 25 boxes are inserted following the same method above, another middle frame (4-3) is mounted and compact tightly to the inserted boxes, the two sides of the middle frame are welded to the side frame of the parallelogram frame, a settlement module (4) is formed.

The side frame of the overflow chute (4-4) is installed on the upper part of the settlement module with the same width as the parallelogram frame (4-1). The inside of the side frame of the overflow chute (4-4) has an inner overflow chute (4-5), its height and tilt angle are adjustable. The overflow discharge tube (4-6) is welded to one end of the overflow chute (4-4). The vibrator bracket (4-7) is welded, on the two sides at the center-of-gravity position of frame of the settlement module. The bottom plate of the vibrator (4-8) is welded on top of the bracket, and a mechanical vibrator (4-9) with the rated power of 0.55 kW is installed on the bottom plate with screws and bolts. The frequency of the vibrator is 2980 times/min.

Forty inclined plate box modules divide into ten groups and intermittently vibrate by group, with vibration time lasting for 3 min and intermittence time lasting for 180 min. Both vibration time and intermittence time can be regulated via two external control cabinets.

After the equipment put into use, the underflow concentration of the settlement separator reached to ≥65%, which provide the qualified feeding for the filtrator and meet the demand of tailings drying discharge. The distortion of inclined plate boxes, as well as caking or blockage of settlement channel do not observed during the operation. The good benefits are achieved.

Embodiment 4

An industrial waste water treatment plant needs to separate most part of solid particles before oxidation and creation by using settlement pool. The flow rate of feeding is 500 m³/h, and the content of solid particles is 10 g/l. The waste water is pretreated by using flocculant. The solid content of overflow should be ≥500 mg/l after settlement. The design adopts a round-pool central driving thickener, and vibrating inclined plate box modules are installed in the pool with a total settlement area of 960 m².

The entirety structure of the thickener is the same as the conventional round-pool thickener. The body of the pool is reinforced concrete with the height of 3.5 m. The central driving harrow frame can be lifted b hydraulic device. 16 vibrating inclined plate box modules (4) are installed onto the pool in radiation. The settlement area of each inclined plate box module is 60 m². The total settlement area is increase to 960 m² after the box modules are installed. The inclined plate box modules are made by the description of the invention. The parallelogram frame (4-1) of the module is spliced and welded by steel structures. The included angle ($\alpha$) between the frame and ground level is 50°. The length of the parallelogram frame is 6500 mm, the height is 1600 mm, and the width is 700 mm. The width of the inclined plate box (4-2) is 600 mm, the length is 2000 mm, and the thickness is 50 mm. There are four inner ribs (4-2-3) along with the width direction of the inclined plate box, which divide the inclined plate box into five long and narrow settlement channels (4-2-5) of the same size. The thickness of panels (4-2-1) and (4-2-2) the inner ribs (4-2-3), and the side wall (4-2-4) of the plate box are 1.0 mm. After the two sides of the inclined plate box tilt to 50°, which are inserted to the parallelogram frame (4-1) one by one. The bottom of the boxes is supported by square steel. After 26 inclined plate boxes are inserted, the middle frame (4-3) made of square steel is mounted and compact tightly to the inserted boxes. The two sides of the middle frame (4-3) are welded to the side frame of the parallelogram frame (4-1). While two more groups of inclined plate boxes with 26 boxes are inserted following the same method above, another middle frame (4-3) is mounted and compact tightly to the inserted boxes, the two sides of the middle frame are welded to the side frame of the parallelogram frame, a settlement module (4) is formed. The side frame of the overflow chute (4-4) is installed on the upper part of the settlement module with the same width as the parallelogram frame (4-1). The inside of the side frame of the overflow chute (4-4) has an inner overflow chute (4-5), its height and tilt angle are adjustable. The overflow discharge tube (4-6) is welded to one end of the overflow chute (4-4). The vibrator bracket (4-7) is welded on the two sides at the center-of-gravity position of frame of the settlement module. The bottom plate of the vibrator (4-8) is welded on top of the bracket, and a mechanical vibrator (4-9) with the rated power of 0.25 kW is installed on the bottom plate with screws and bolts. The frequency of the vibrator is 2980 times/min. Sixteen inclined plate box modules divide into four groups and intermittently vibrate by group, with vibration time lasting for 1 min and intermittence time lasting for 180 min. Both vibration time and intermittence time can be regulated via an external control cabinet as required.

After the equipment put into use, the solid content of overflow is down to ≤400 mg/l, and more than 96% solid particles are removed. The distortion of inclined plate boxes, as well as caking or blockage of settlement channel do not observed during the operation. The expected benefits are achieved.

The invention claimed is:

1. A vibrating inclined plate box settlement separator, comprising an upper box; and
a lower tapered hopper;
wherein the upper box and the lower tapered hopper are connected securely to each other and sealed;
wherein the upper box is a rectangular or square steel box with supporting platforms on left and right sides of the upper box; a plurality of spring assemblies are located on the supporting platforms; a plurality of inclined plate box modules are mounted on the supporting platforms, wherein each of the plurality of inclined plate box modules is vibrating separately by a vibrator; a feed box is located on a side of the top of or inside the upper box; an overflow collect chute is welded on a side of the upper box opposite to the feed box; the plurality of settlement modules and the overflow collect chute are connected with a rubber tube;
wherein a shape of the lower tapered hopper is selected from a group consisting of cone and pyramid; the lower tapered hopper is placed on a steel bracket of equipment or to a reinforced concrete framework; wherein a second tapered hopper is connected to a bottom of the lower tapered hopper, wherein a size of the second tapered hopper is smaller than that of the lower tapered hopper;
wherein each settlement module consists of a plurality of inclined plate boxes, a plurality of middle frames, and a parallelogram frame;
wherein the plurality of inclined plate boxes are inserted into a sloped side of the parallelogram frame, and lower parts of the plurality of inclined plate boxes are supported by a plurality of profiles at a bottom of the parallelogram frame; wherein a bottom panel of a second inclined-plate box is attached to a top panel of a first inclined plate box; wherein the bottom panel of the second inclined plate box and the top panel of the first inclined plate box support each other so that an inclined settlement plate is twice as thick as a single inclined plate box; wherein the profile at the bottom of the parallelogram frame is selected from a group consisting of square tube and steel angle;
wherein each of the plurality of middle frames made of steel profiles is loaded into the sloped side to compact each of the plurality of inclined plate boxes after more than 10 inclined plate boxes are inserted into the sloped side; wherein both sides of each of the plurality of middle frames are welded onto two sides of the parallelogram frame to prevent displacement of the plurality of inclined plate boxes as well as to increase strength and rigidity of the parallelogram frame.

2. The vibrating inclined plate box settlement separator of claim 1, wherein the lower tapered hopper is made from reinforced concrete structural or welded by steel; wherein the second tapered hopper is lined inside with wear-resistant rubber or coated with polyurethane; wherein the lower tapered hopper and the second tapered hopper are connected by a plurality of screws or bolts, and sealed with at least one wick or rubber gasket.

3. The vibrating inclined plate box settlement separator of claim 1, wherein the plurality of inclined plate boxes are inserted into the parallelogram frame with an angle ranging from 30° to 70° between the sloped side of the parallelogram frame and ground level.

4. The vibrating inclined plate box settlement separator of claim 3, wherein each of the plurality of inclined plate boxes is a long rectangular box and a length of each of the plurality of inclined plate boxes is the same as that of the sloped side of the parallelogram frame; wherein the inclined settlement plate consists of both the top panel and the bottom panel of each of the plurality of inclined plate boxes; wherein at least two inner ribs support the top panel and the bottom panel of each of the plurality of inclined plate boxes along a direction of a width of each of the plurality of inclined plate boxes, so that each of the plurality of inclined plate boxes has a plurality of long and narrow independent settlement channels; wherein a guide edge is located on a side wall of each of the plurality of inclined plate boxes and is configured to prevent displacement when assembling multiple of the inclined plate boxes.

5. The vibrating inclined plate box settlement separator of claim 1, wherein each of the plurality of inclined plate boxes comprises a plurality of parent materials and; wherein the plurality of the parent materials are selected from a group consisting of at least two of polycarbonate, polystyrene, polymethylmethacrylate, polyethylene, polypropylene, polyvinyl chloride, polyester fiber, acrylic butadiene styrene or a combination of polycarbonate, polystyrene, polymethylmethacrylate, polyethylene, polypropylene, polyvinyl chloride, polyester fiber, acrylic butadiene styrene; wherein each of the plurality of inclined plate boxes is extruded from a mold with prepared pellets.

6. The vibrating inclined plate box settlement separator of claim 1, wherein an overflow chute side frame is located on a top part of the settlement module and with the same width as the parallelogram frame; wherein an inner overflow chute with adjustable height and tilt angle is located on an inside of the overflow chute side frame; wherein an overflow discharge tube is welded on one end of the overflow chute side frame.

7. The vibrating inclined plate box settlement separator of claim 1, wherein a vibrator bracket is welded at a center-of-gravity position of the settlement module and on the two sides of the parallelogram frame; wherein a bottom plate of the vibrator is welded on a top of the vibrator bracket, and the vibrator is fastened onto the bottom plate with a plurality of screws and bolts; wherein the vibrator is selected from a group consisting of mechanical and electromagnetic; wherein vibration frequency of the vibrator is in a range from 800 time/min to 3000 times/min, and power of the vibrator is in a range of 0.15 kW to 1.0 kW, which are determined by a vibration amplitude and settlement area of the settlement modules.

8. The vibrating inclined plate box settlement separator of claim 1, the parallelogram frame is welded with steel selected from a group consisting of angle steel, U-steel, and square steel; wherein a length of the parallelogram frame is greater than 500 mm, a height of the parallelogram frame is greater than 500 mm, and a width of the parallelogram is greater than 300 mm; wherein the plurality of spring assemblies are compound springs made of flexible materials selected from a group consisting of rubber, steel, polyurethane; wherein the plurality of settlement modules are arranged in parallel on the same horizontal plane or are arranged as a central driving round pool thickener.

9. The vibrating inclined plate box settlement separator of claim 1, a flow control valve is directly installed into the bottom of the second tapered hopper.

10. The vibrating inclined plate box settlement separator of claim 1, wherein each of the inclined plate boxes comprises a top panel, a bottom panel, two side walls, and at least two inner ribs, the two side walls and the at least two inner ribs supporting the top panel and the bottom panel along the width direction of the inclined plate box, such that each of the inclined plate boxes forms several long and narrow independent settlement channels.

* * * * *